(12) United States Patent
Orlando

(10) Patent No.: US 8,743,670 B2
(45) Date of Patent: Jun. 3, 2014

(54) DATA MEDIUM OF THE COMPACT DISC TYPE, IN PARTICULAR FITTED WITH PROTECTION AGAINST COPYING, AND CORRESPONDING METHOD

(75) Inventor: William Orlando, Peynier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 123 days.

(21) Appl. No.: 13/267,486

(22) Filed: Oct. 6, 2011

(65) Prior Publication Data

US 2012/0087228 A1  Apr. 12, 2012

(30) Foreign Application Priority Data

Oct. 7, 2010 (FR) ...................................... 10 58144

(51) Int. Cl.
*G11B 7/00* (2006.01)
(52) U.S. Cl.
USPC ...................... 369/53.21; 369/189; 369/272.1
(58) Field of Classification Search
USPC ............. 369/272.1, 273, 275.4, 275.5, 53.21, 369/189, 267
See application file for complete search history.

(56) References Cited

U.S. PATENT DOCUMENTS

| 5,790,489 A * | 8/1998 | O'Connor ..................... 369/52.1 |
| 6,532,201 B1 * | 3/2003 | Hogan ........................ 369/53.21 |
| 6,834,393 B2 * | 12/2004 | Akimaru et al. .............. 720/698 |
| 2002/0118631 A1 * | 8/2002 | Kuo et al. ...................... 369/264 |
| 2002/0126606 A1 * | 9/2002 | Carson ........................ 369/53.21 |
| 2004/0101282 A1 * | 5/2004 | Kuroda et al. .................. 386/94 |
| 2006/0072396 A1 * | 4/2006 | Richter et al. ............... 369/47.1 |
| 2008/0273451 A1 * | 11/2008 | Shuster ........................ 369/284 |
| 2009/0073817 A1 * | 3/2009 | Shuster ....................... 369/13.35 |

FOREIGN PATENT DOCUMENTS

| WO | 02/75645 | 9/2002 | ............ G06K 19/04 |
| WO | 2006/062995 | 6/2006 | ............ G06Q 99/00 |

* cited by examiner

*Primary Examiner* — Thomas Alunkal
(74) *Attorney, Agent, or Firm* — Allen, Dyer, Doppelt, Milbrath & Gilchrist, P.A.

(57) ABSTRACT

A data medium of the compact disc type may include medium areas of different types configured to define digital content, and a controllable element having two different states corresponding respectively to the two different types of areas. The controllable element may be configured to take selectively one of its states in response to a command, so as to modify in a controllable manner the content of the data medium.

21 Claims, 8 Drawing Sheets

| SPEED (X) THRESHOLD | 0 | 1 | 2 | 4 | 4 | 4 | 2 | 4 | 8 | 4 | 2 | 4 | 8 | 4 | 8 | 4 | 2 |
|---|---|---|---|---|---|---|---|---|---|---|---|---|---|---|---|---|---|
| ELD1 3X | 0 | 0 | 0 | 1 | 1 | 1 | 0 | 1 | 1 | 1 | 0 | 1 | 1 | 1 | 1 | 1 | 0 |
| ELD2 6X | 0 | 0 | 0 | 0 | 0 | 0 | 0 | 0 | 1 | 0 | 0 | 0 | 1 | 0 | 1 | 0 | 0 |
| BIT READ | | | | | | | 0 | | 1 | | 0 | | 1 | | 1 | | 0 |

FIG. 14

DATA MEDIUM OF THE COMPACT DISC TYPE, IN PARTICULAR FITTED WITH PROTECTION AGAINST COPYING, AND CORRESPONDING METHOD

FIELD OF THE INVENTION

The present disclosure relates to data media of the compact disc (CD) type, such as, for example, audio CDs or Digital Versatile Discs (DVDs), and, more particularly, the protection of such media against illegal copying.

BACKGROUND OF THE INVENTION

Currently there are various ways of protecting the content of a compact disc. It is possible, for example, to use static protection techniques including inserting errors in certain locations of the content of the disc. However, such protection can be broken by automatic tools.

Another approach includes using non-standard encoding for encoding the content of the compact disc, as is the case, for example, in certain game consoles. However, this type of protection does not allow a standard drive to be used, but typically requires a dedicated drive. Another approach includes fixing an external chip, for example, a radio frequency label, on the medium, so as to be able to authenticate it. However, such an approach again may require the use of a specific drive, comprising a contactless reading module.

SUMMARY OF THE INVENTION

According to an aspect, a medium of the compact disc type may be fitted with a protective means or a protective module compatible with a standard drive.

According to another aspect, a compact disc medium may be fitted with a protective module allowing an interchange of information with a drive that can be a standard drive.

According to another aspect, a data medium of the compact disc type, having medium areas of different types, may be configured to define digital content.

According to another aspect, the data medium may also comprise at least one controllable element having at least two different states corresponding respectively to two different types of areas. The at least one element may be configured to take selectively one of these states in response to a command, so as to modify in a controllable manner the content of the data medium.

According to a general feature of this aspect, the data medium also may comprise at least one controllable element having at least two different states corresponding respectively to two different types of areas. The at least one element may be configured to take selectively one of these states in response to a command, so as to modify in a controllable manner the content of the data medium.

In some embodiments, the at least one element may be configured to take selectively one of these states under the application of a centrifugal force forming the command and resulting from a rotation of the medium. Thus, in this case, the drive can impose on the medium different and predetermined rotation speeds and read the content of the data medium that may differ depending on the speeds. Comparing these read contents with reference contents associated with reference rotation speeds may make it possible to authenticate the medium.

According to another embodiment, the medium may comprise control means or a controller configured to place the at least one element selectively in one of these states. In such an embodiment, the various states of the element are therefore imposed by the controller, for example, a micro-actuator, placed in and/or on the medium, which makes it possible to transmit, in a controlled manner, digital information from the medium to the drive.

This element can be combined with at least one additional element having at least two different states and being configured to take selectively one of these states in response to a centrifugal force resulting from a controllable rotation of the medium, so as to allow a controlled transmission of digital information from the drive to the medium. The values of the digital information may depend on the different states of the additional element. It is therefore possible to establish a two-way interchange between the drive and the medium.

This additional element then forms, for example, an input element, controlled by the centrifugal force resulting from rotation with a speed controlled by the drive. This may allow the data medium to receive data from the drive while the element controlled by the controller, the medium, for example, a piezoelectric element, forms an output element making it possible to modify, on command, the digital content of the medium and thus be able to transmit data from the medium to the drive. The element and/or the additional element may be objects of the microelectromechanical system (MEMS) type.

According to one embodiment, the at least one element may have more than two different states, each state corresponding to a type of area and at least two different states corresponding respectively to different types of areas. For example, the at least one element may comprise a deformable portion configured to take at least two different positions corresponding respectively to at least two different states associated respectively with different types of areas.

Typically, a data medium of the compact disc type may comprise a base supporting a reflective layer having pitted areas and land areas, forming respectively the medium areas of different types. In this case, the at least one element may comprise, for example, a frame, and the deformable portion may comprise, for example, a cantilevered beam fixed to the frame and having a reflective portion on one of its faces. The frame may be inserted into the medium so as to place the reflective portion of the beam substantially in the same plane as a land area of the reflective layer and turned towards the base. The cantilevered beam may be configured so as to place the reflective portion, in response to the command, in the at least two different positions.

In other words, the cantilevered beam is, for example, placed in an area of the disc straddling one or more grooves and, depending on the rotation speed of the medium, the element may or may not deform in order to behave like a pitted area or a land area. In other embodiments, the element may comprise a casing and a body that can rotate relative to the casing. The body may have on its outer surface at least two portions corresponding to at least two different types of areas, each portion corresponding to a different angular position of the body. Thus, for example, the outer surface of the body may comprise land reflective areas and pitted areas.

When the command results from a centrifugal force, the element may preferably be placed so that it is the most sensitive to the centrifugal force. On the other hand, when the command results from an internal command originating from the controller placed in the medium, the element may advantageously be placed so that it is virtually insensitive to a centrifugal force resulting from rotation of the medium.

On the other hand, when the element is coupled to at least one additional element forming an input element that can be controlled by the centrifugal force resulting from rotation of the medium, this additional element may be placed so that it is particularly sensitive to the centrifugal force. This additional element may have a structure identical to the element. It may, for example, comprise a cantilevered beam capable of taking, for example, two different positions corresponding to two different rotation speeds of the medium or two different ranges of rotation speed.

Thus, for example, this additional element may comprise a cantilevered beam connected to a power supply source and capable, in response to a first rotation speed of the medium, of coming into contact with a first pad and capable, in response to a second rotation speed of the medium, of coming into contact with a second pad. In this case, the cantilevered beam may preferably extend substantially perpendicularly to a radius of the medium.

According to another aspect, a system may comprise a data medium of the compact disc type, as defined above, and a reading device capable of controlling the rotation speed of the medium and of reading the content of the data medium. According to another aspect, a method may comprise a command of at least one controllable element placed in and/or on a data medium of the compact disc type having medium areas of different types configured to define a digital content of the medium. The at least one controllable element may have at least two different states corresponding respectively to two different types of areas, so as, in response to the command, to make it take selectively one of its states, and thus modify the content of the data medium.

According to an embodiment, the selective adoption of one of the states of the at least one element, in response to the command, may comprise a deformation of at least one portion of the at least one element. The selective adoption of one of the states of the at least one element, in response to the command, may comprise a rotation of the at least one element. The command may comprise an application to the at least one element of a centrifugal force resulting from a rotation of the medium.

In another embodiment, the command may also come from the controller, for example, a micro-actuator or else means making it possible to generate a variable electric field, placed in and/or on the medium and configured in order to place the at least one element selectively in one of its states. Thus, as an example, the at least one element may comprise a piezoelectric material, and the command then comprises an application of a variable electric field to a piezoelectric element.

According to another embodiment, the method may comprise an application of a centrifugal force resulting from a controllable rotation of the medium to at least one additional element placed in and/or on the medium and having at least two different states. This is to make it take selectively one of these states in response to the centrifugal force resulting from a controllable rotation of the medium, and thus to allow a controllable transmission of digital information the values of which depend on the various states of the additional element.

BRIEF DESCRIPTION OF THE DRAWINGS

Other advantages and features of the present disclosure will appear on examining non-limiting embodiments and modes of application and on examining the appended drawings, in which:

FIG. 14 is a chart of the bits transmitted via the control device, according to the present invention.

DETAILED DESCRIPTION OF THE PREFERRED EMBODIMENTS

Figure 1:
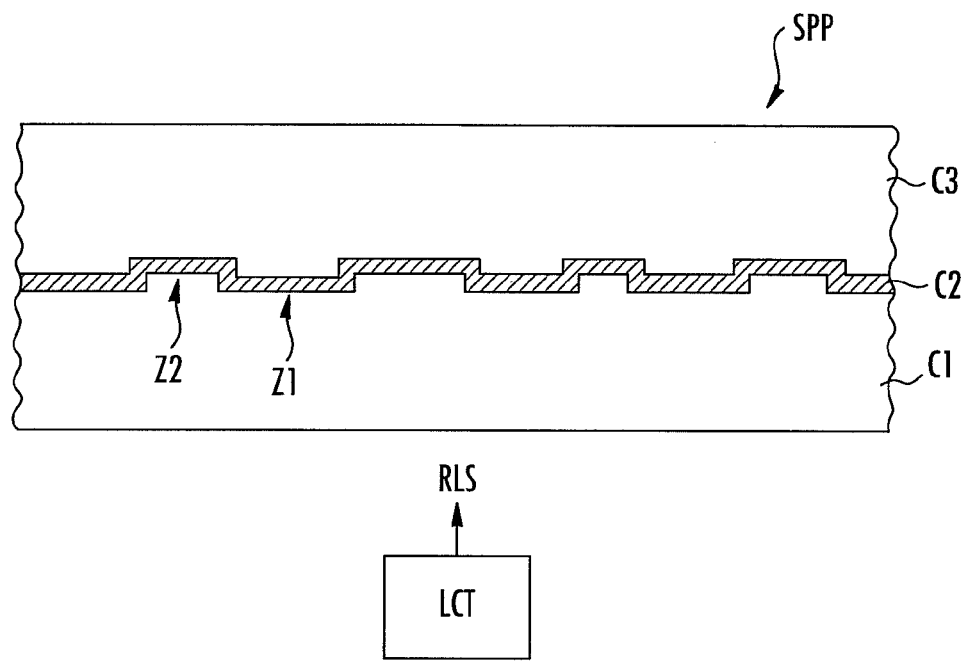
FIG. 1 is a cross-sectional view of the CD, according to the present invention.

In FIG. 1, the reference SPP designates a data medium of the compact disc type. The compact disc in this instance comprises a polycarbonate disc C1 typically having a thickness of the order of a millimeter, covered with a fine metal layer C2, for example a layer of aluminum, protected by a protective layer C3, for example a layer of lacquer. The thickness of the layer C2 is typically of the order of 40 to 50 nm, while the thickness of the layer C3 is typically of the order of 10 microns, which results in a total thickness of the disc of the order of 2 to 3 mm.

Figure 2:
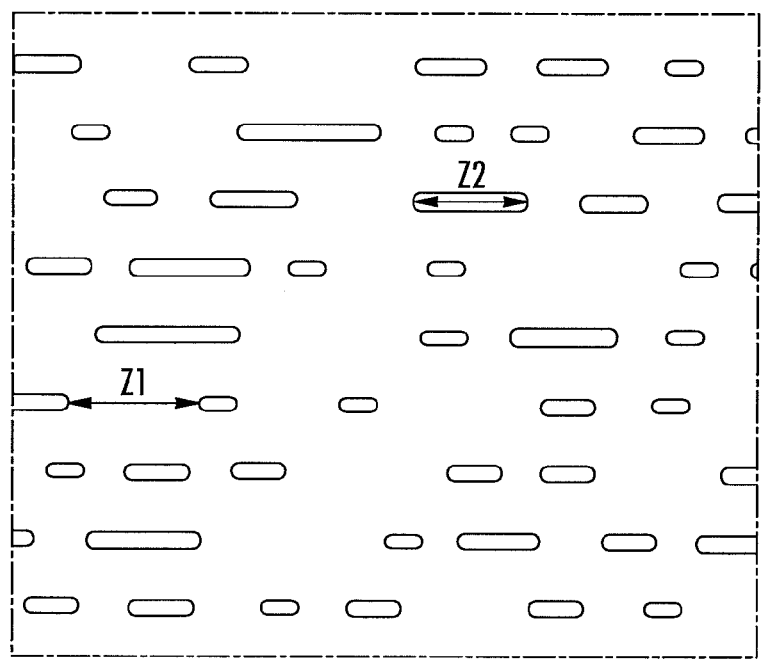
FIG. 2 is an enlarged top side view of the CD of FIG. 1.

As illustrated in FIG. 2, the digital information contained in the medium SPP is encoded on a track of pits spiral molded into the polycarbonate. The medium SPP therefore comprises, seen from the layer C1, land areas Z1 and pitted areas Z2. Typically, each pitted area Z2 measures approximately between 125 nm and 500 nm in width, and varies between 833 nm and 3.5 micrometers in length. The space between the tracks is 1.6 microns.

The disc is read by a laser beam RLS emitted by a drive LCT. This laser beam has, for example, a wavelength of 780 nm and passes through the layer of polycarbonate. The difference in depth between the pitted area Z2 and the land area Z1 is a quarter of the wavelength of the laser beam, which makes it possible to have a phase shift of a half wavelength between a reflection of the laser in a pitted area and on a land area. The destructive interference caused by this reflection reduces the intensity of the reflected light in a pitted area compared with a reflection on a land area. By measuring this intensity with a photodiode, it is therefore possible to read the data on the disc. The transition from a pit (area Z2) to a land (area Z1), or from a land to a pit, indicates, for example, a logic "1." An absence of land-pit transition represents a logic "0."

Usually, the medium comprises several areas. Thus, in the case of an audio CD, it is possible to distinguish a lead-in area, a term known to those skilled in the art, which contains information describing the payload digital content of the medium and stored in a specific table called TOC ("Table of Contents"). As an indication, the lead-in area extends, for example, from the 23 mm radius to the 25 mm radius.

The lead-in area is followed by an area called the "program" area containing the actual payload data and begins from the 25 mm radius and can extend up to the 58 mm radius, for example. Finally, there is a lead-out area (LOA) containing blank data (corresponding to the "silence" for an audio CD), and this lead-out area marks the end of the CD. This area may begin at the 58 mm radius, and may contain a minimum number of sectors, typically 6750.

Figure 3:
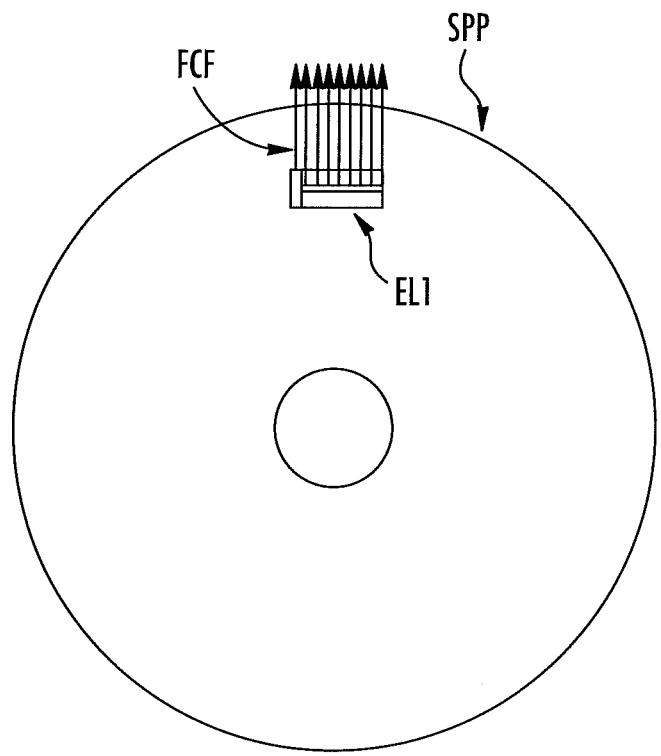
FIG. 3 is a top side view of the CD of FIG. 1.

As illustrated in FIG. 3, the medium also comprises at least one controllable element EL1. This element EL1 has at least two different states corresponding respectively to two different types of areas Z1 or Z2. And this element EL1 is configured to take selectively one of these states in response to a command, which is in this instance a centrifugal force FCF resulting from a rotation of the medium, so as to modify in a controllable manner the content of the data medium. The element may be placed in any portion of the medium. This being so, it is preferable, in order to disrupt as little as possible the data contained in the program area, to preferably place the element in the lead-out area.

Figure 4:
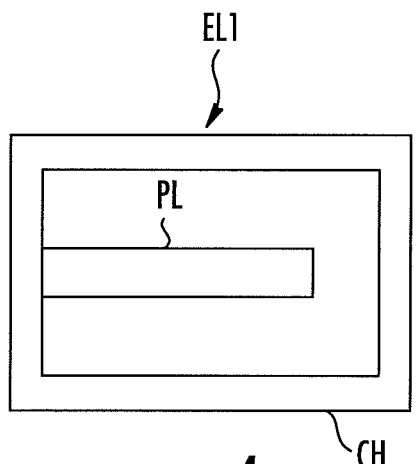
FIGS. 4-5 are side views of a control device in the CD of FIG. 1.
Figure 5:
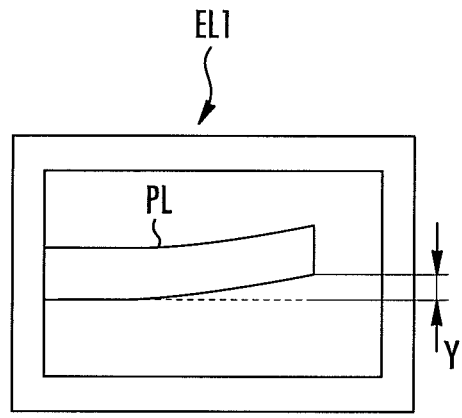

According to one embodiment, illustrated for example in FIGS. 4 and 5, the element EL1 is an element that can be deformed depending on the rotation speed, for example, a beam PL that is cantilever mounted in a frame CH. The whole assembly may be inserted into the reflective area C2 of the data medium. Advantageously, the material is made to work in its area of elasticity in order to ensure a deterministic and repetitive placement. The beam PL has a reflective surface facing the laser beam RLS.

It may be micro-machined in silicon or else in any other material such as copper, aluminum or polysilicon. The beam may preferably be placed along a groove (that is to say tangentially to the groove) so that the centrifugal force FCF, to which it is subjected, maximizes the deformation for a given dimension, which may make it possible to have the smallest possible element. The order of magnitude "y" of the envisaged deformations is a few microns, so as to be able to change the value read by the drive LCT on one or even on several grooves.

A disc medium, such as, a CD or a DVD is used by reading the stream of information from the groove at constant linear speed. The rotation speed therefore varies according to the reading speed (1×=100 kbits/s, 2×=300 kbits/s, etc.) and according to the distance to the center of the disc. Naturally, the element may be configured so as to withstand the force to which it may be subjected when the disc rotates at the maximum speed.

Although placing the element close to the center of the disc reduces the mechanical stresses sustained, certain data structures of a CD are supposed to be situated in a particular area of the disc, such as, for example, the program area. That is why, as indicated above, the element may preferably be placed in a data area, for example, the lead-out area, having no impact on the manner of interpreting the structure (element+ vicinity of the element) relative to the content of the disc. A placement at 5 cm from the center is an acceptable example.

Therefore, with a beam 10 microns wide, 60 microns high and 50 microns long, placed 5 cm from the center, a deformation of more than 1 micron is obtained for a speed of the medium that is equal to 40× and a deformation of less than 1 micron is obtained for lower speeds. Therefore, it may be possible to modify the value of the content of the data medium over at least two grooves. Also, the value of the content read by the drive may differ depending on whether the disc is read at a speed lower than 32× for example, or higher than 40×.

The drive may, for example, control the rotation of the medium with a set of predefined speeds corresponding to different states of the element and therefore to different values of the content of the disc, and may be able therefore to verify that the digital values read correctly match the expected values, which may make it possible to authenticate the disc as being an authentic disc and not a copy. It is possible to place several identical elements distributed over the medium, which in particular makes it possible to increase the possible combinations with respect to the modifications to the content of the medium. Naturally, it would be possible to provide an abutment in the frame CH so as to prevent an excessive deformation of the beam PL that would cause it to break.

The technological production of such an element would be appreciated by those skilled in the art. The element can be machined notably by using semiconductor etching technologies, notably the techniques used for creating electromechanical elements (MEMS) in the interconnection portion (known by those skilled in the art as BEOL ("Back End Of Lines")) above the active silicon portion.

It may be possible, notably in the case of a beam, to machine vertical flats of any cross section from the material surface down to the desired depth by using plasma attacks, and to remove the inaccessible material by vertical machining, by using typical wet chemical attacks. Once the beam is produced, a layer of reflective material is deposited in a conventional manner on at least a portion of the latter. Once the element is produced on a specific semiconductor wafer, it may be able to be taken from this wafer to be inserted into the disc.

More precisely, and as a non-limiting example, the formation of the frame and of the beam that are illustrated in FIG. 3 may comprise the following steps:
  on a substrate of a specific wafer dedicated to the production of several elements:
  growing of a silicon oxide to a depth corresponding to the total thickness of the frame,
  deposition of a mask in the shape of the beam and of the periphery of the frame,
  etching of the oxide through the mask to the desired depth (height of the beam),
  deposition of material in order to fill the cavity resulting from the previous etching, and to produce the beam and the frame (as an indication, the material could be metal or polysilicon),
  deposition of a protective mask on the beam and the frame that are thus formed,
  plasma etching in order to remove the material around the beam,
  wet etch to release the beam (removal of the material beneath the beam),
  deposition of a layer of reflective material on the beam,
  taking the wafer from the element thus produced, for example by sawing, and
  insertion of the element into the medium.

As an example, the element can be placed in a hole countersunk after production of the compact disc. The hole thus countersunk extends from the top of the disc (layer C3) to the reflective layer C2. The element is then placed in the hole, reflective face downwards, that is to say turned towards the polycarbonate layer C1.

Holding in place can be achieved, for example, by using insertion by force or else bonding with a resin or polycarbonate, or else by heating the element during the insertion in order to cause the polycarbonate to melt into the contact areas.

Therefore, for a given rotation speed, or a given range of rotation speeds, the beam is not deformed, presenting its reflective surface to the drive, and behaves like an area of the Z1 type. On the other hand, for a higher rotation speed or a higher range of rotation speeds, the beam is deformed, disengaging its reflective surface from the laser beam in order to behave like a pitted area.

Figure 6:
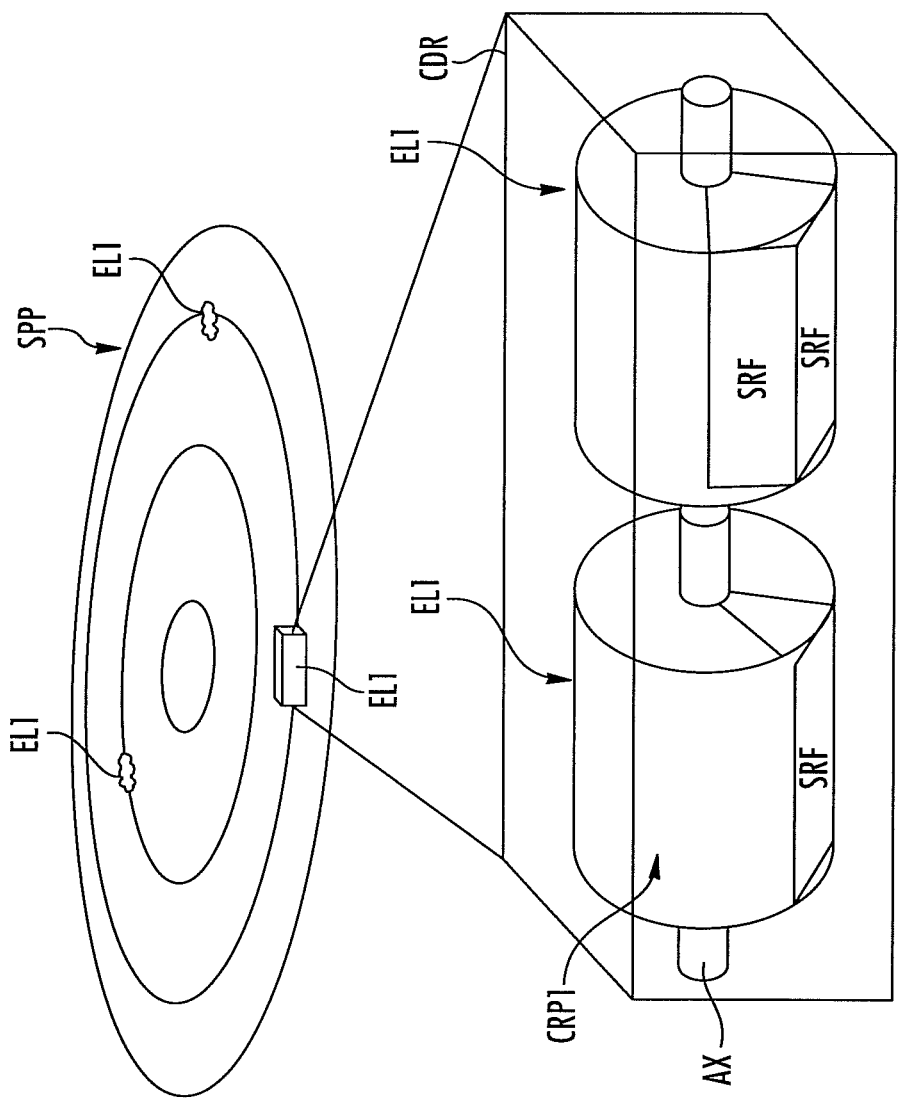
FIG. 6 is a view of another embodiment of the control device, according to the present invention.

Other modes of producing the element EL1 are naturally possible, as illustrated, for example, in FIG. 6. In this figure, the element EL1 comprises a casing CDR and a body CRP1 that can rotate about a spindle AX in the casing CDR. The body CRP1 has, on its outer surface, one portion comprising one or more reflective surfaces SRF and another portion comprising no reflective surface. These two portions correspond to at least two different angular positions of the body when the latter is subjected to a centrifugal force. Therefore, depending on the rotation speed of the medium, the laser beam may be facing a reflective surface SRF of the body, the latter then behaving like an area of the Z1 type, or else facing the portion of the body with no reflective surface, the latter then behaving like a Z2 area.

Figure 8:
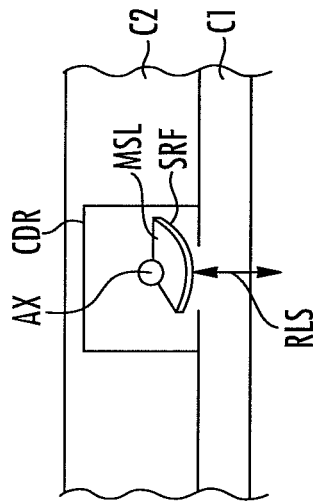
FIG. 8 is a view of a portion of the CD, according to the present invention.
Figure 9:
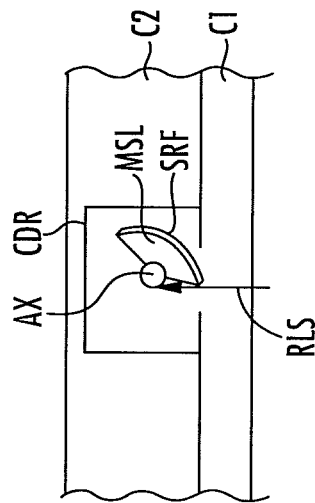
FIG. 9 is a view of a portion of the CD, according to the present invention.
Figure 7:
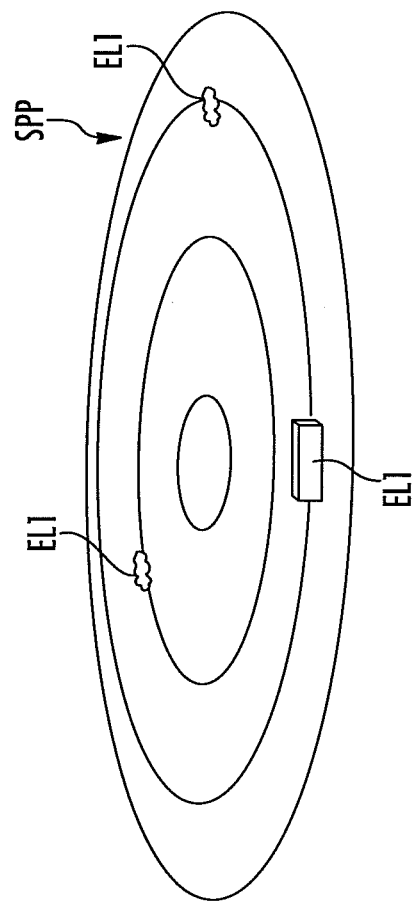
FIG. 7 is a view of the CD with the control device, according to the present invention.

In FIGS. 7, 8 and 9, each element EL1 comprises a small weight MSL that can rotate in a frame CDR about a spindle AX. The small weight has a curved outer surface with a reflective surface SRF. In a first configuration illustrated in FIG. 8, and corresponding to a first rotation speed of the medium, the small weight presents its reflective surface to the laser beam RLS. The drive therefore interprets the element as being an area of the Z1 type.

Figure 10:
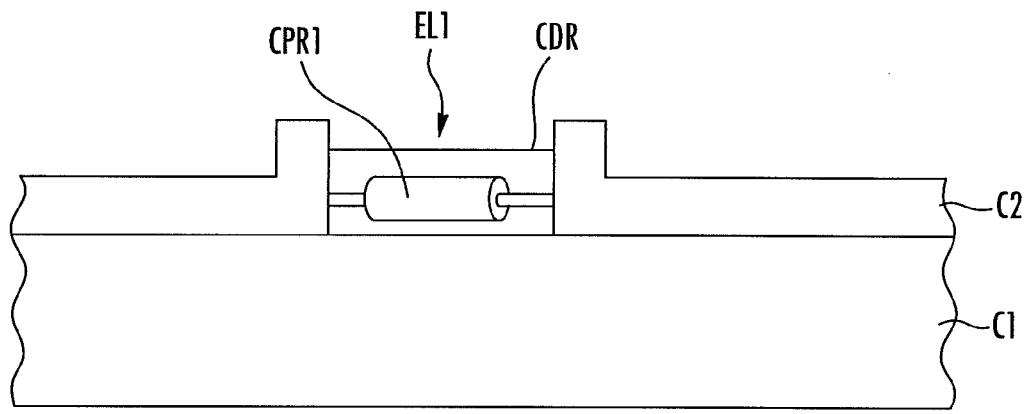
FIG. 10 is a view of the control device, according to the present invention.

In another configuration, illustrated in FIG. 9, and corresponding to another rotation speed of the medium, higher than the first, the reflective surface of the small weight MSL is not situated facing the laser beam RLS and the latter then enters the frame CDR. The element EL1 then behaves like an area of the Z2 type. Here again, it can be seen, in FIGS. 8 and 9, that the element EL1 is inserted into the metal layer C2 of the medium. This also applies to the element EL1 in FIG. 6, as illustrated in FIG. 10.

Figure 11:
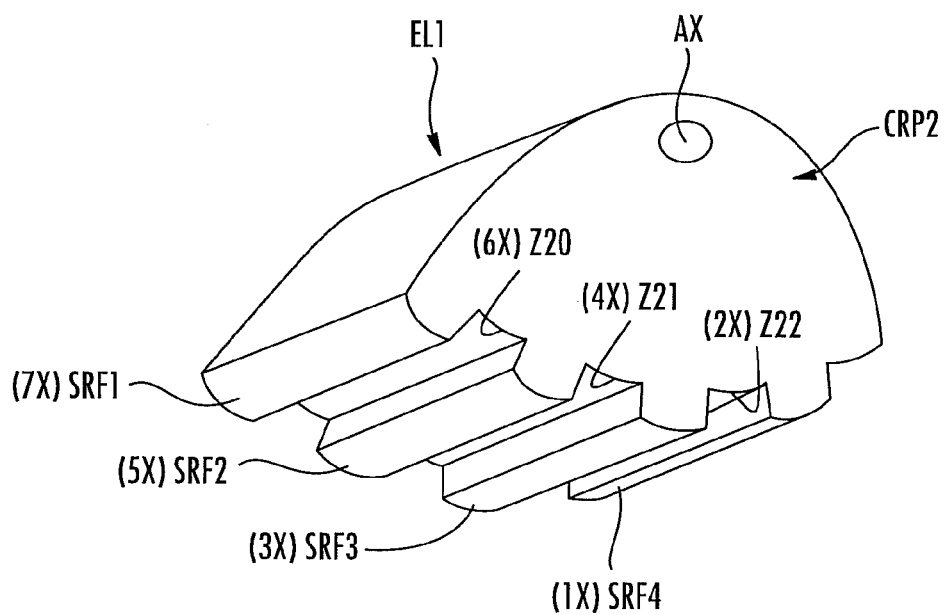
FIG. 11 is a view of another embodiment of the control device, according to the present invention.

Another exemplary embodiment is illustrated in FIG. 11. In this example, the element EL1 comprises a body CRP2, also able to move about a spindle AX in a frame CDR (not shown here for simplification). The body CRP2 comprises a crenulated outer surface comprising land areas fitted with reflective surfaces SRF1, SRF2, SRF3, SRF4 separated by pitted areas Z20, Z21 and Z22 comprising no reflective surface.

Depending on the rotation speed, the body CRP2 may take different angular positions in order to present to the laser beam RLS either a reflective surface, or a pitted area. Therefore, for speeds 1×, 3×, 5× and 7×, the body CRP2 may present, to the laser beam, the respective reflective surfaces SRF4, SRF3, SRF2 and SRF1. For rotation speeds equal to 2×, 4× and 6×, the body may present, to the laser beam, the pitted areas Z22, Z21 and Z20. Naturally, it would be possible to replace the pitted areas with land areas fitted, for example, with an absorbent material.

Figure 12:
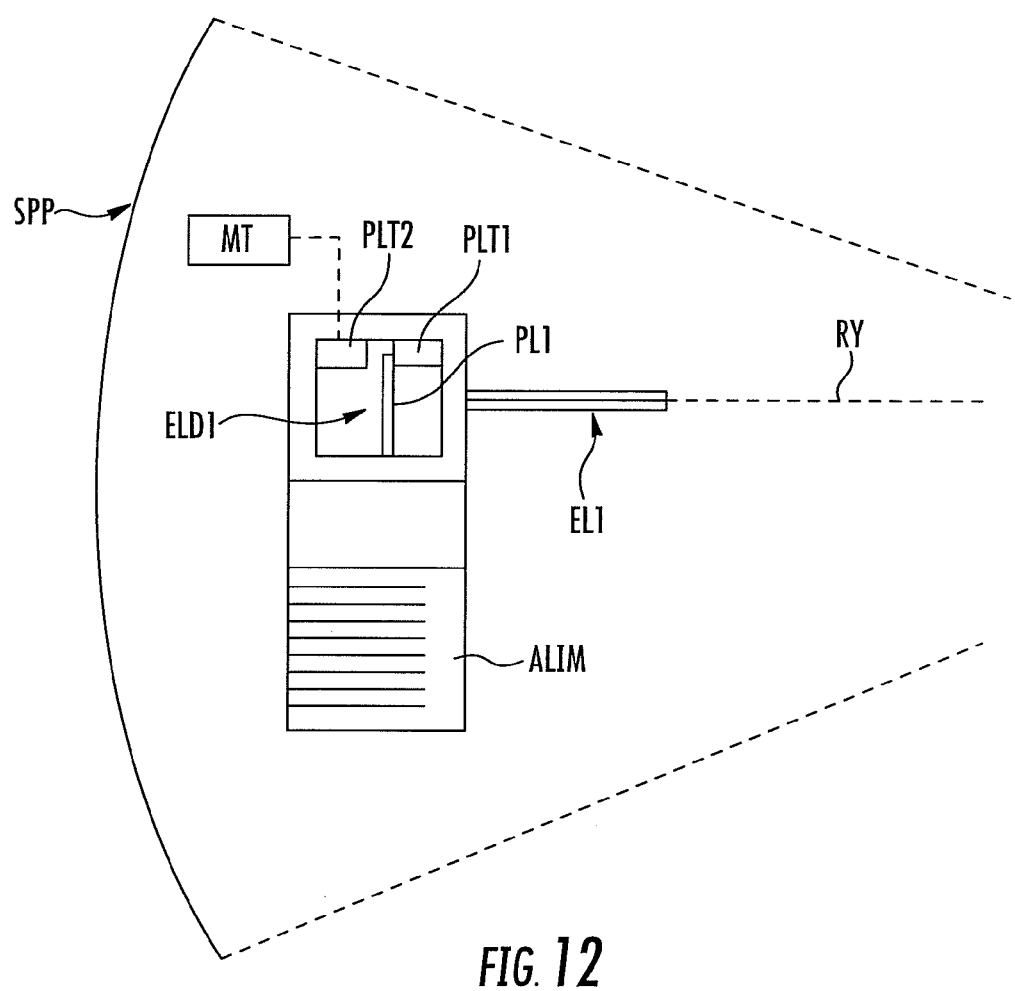
FIG. 12 is a top side view of the CD with the control device, according to the present invention.

Reference is now made to FIG. 12 and following in order to describe embodiments and modes of application allowing a two-way communication between the drive and the data medium. In this respect, the element EL1 is combined, as illustrated in FIG. 12, with at least one additional element ELD1.

As may be seen in greater detail below, the additional element ELD1 may be used to allow the transmission of digital information from the drive to the compact disc by being controlled by the centrifugal force resulting from the rotation of the medium. The element EL1, for its part, may be used to allow the transmission of digital information from the compact disc to the drive. In this respect, it may be controlled by control means or a control device placed in and/or on the medium.

In this respect, the additional element ELD1, which is controlled by the centrifugal force, may preferably, for example, when a cantilevered beam is involved, be placed perpendicularly to a radius of the disc, that is to say substantially tangentially to a groove. On the other hand, the element EL1 is preferably placed so as to be as insensitive as possible to the centrifugal force. It may therefore be placed, for example, when it is produced by a beam, so as to extend parallel to a radius RY, i.e. perpendicularly to the tangent to a groove.

As indicated above, the element ELD1 is used to communicate information from the application software contained in the disc drive (or else in the processor and its memory of a computer fitted with a disc drive), to the compact disc. This application software may control this modifiable element ELD1 by virtue of variations in the rotation speed of the medium. As an indication, as illustrated in FIG. 12, a particularly simple embodiment provides for the element ELD1 to comprise a beam PL1 coming into contact with a first pad PLT1 when the rotation speed of the medium is below a predetermined threshold, and deforming in order to contact a second pad PLT2 when the rotation speed of the medium is higher than the threshold. The beam PL1 is moreover connected by one of its ends to power supply means ALIM, for example, a battery, while the pad PLT2 is connected to processing means MT or a processor.

Therefore, a contact of the beam PL1 on the pad PLT1 represents a logic "0" while a contact of the beam PL1 on the pad PLT2 makes it possible to connect the power supply to the processor and consequently represents a logic "1". The disc drive may therefore, by controlling the rotation speeds below and above the threshold, transmit logic "0"s or "1"s to the processor, for example a microcontroller, placed in the medium.

As an indication, the bits are sent one after the other and have a fixed duration. A start bit preceded by a "silence" and at least one "stop" bit may come either side of the payload bits. The correct reading of several consecutive bits means that the time references may be stable and sufficiently precise to prevent bit de-synchronizations. The parameters that have an influence on correct communication are mainly: the relative values of the time references of the transmitter (drive) and of the receiver (medium), and the stability of these time references. In order to reduce these relative precision constraints, it may be possible preferably to use a low transmission speed reducing the impact of frequency difference between transmitter and receiver; to reduce the number of consecutive bits transmitted; and to reduce sufficiently the frequency and/or the length of the series of consecutive bits sent.

It may also be possible in addition to use a conventional time base synchronization procedure in order to alleviate manufacturing inconsistencies and/or timing stability defects, for example, with the aid of a long consecutive sequence of alternating 0s and 1s.

The compact disc fitted with an oscillator can then adapt the period of its oscillator to be synchronous with the signal edges. For example, in the case of an oscillator made using a programmable and self-resetting counter rated by an internal oscillator, the adaptable parameter would be the counter reloading value.

Figure 13:
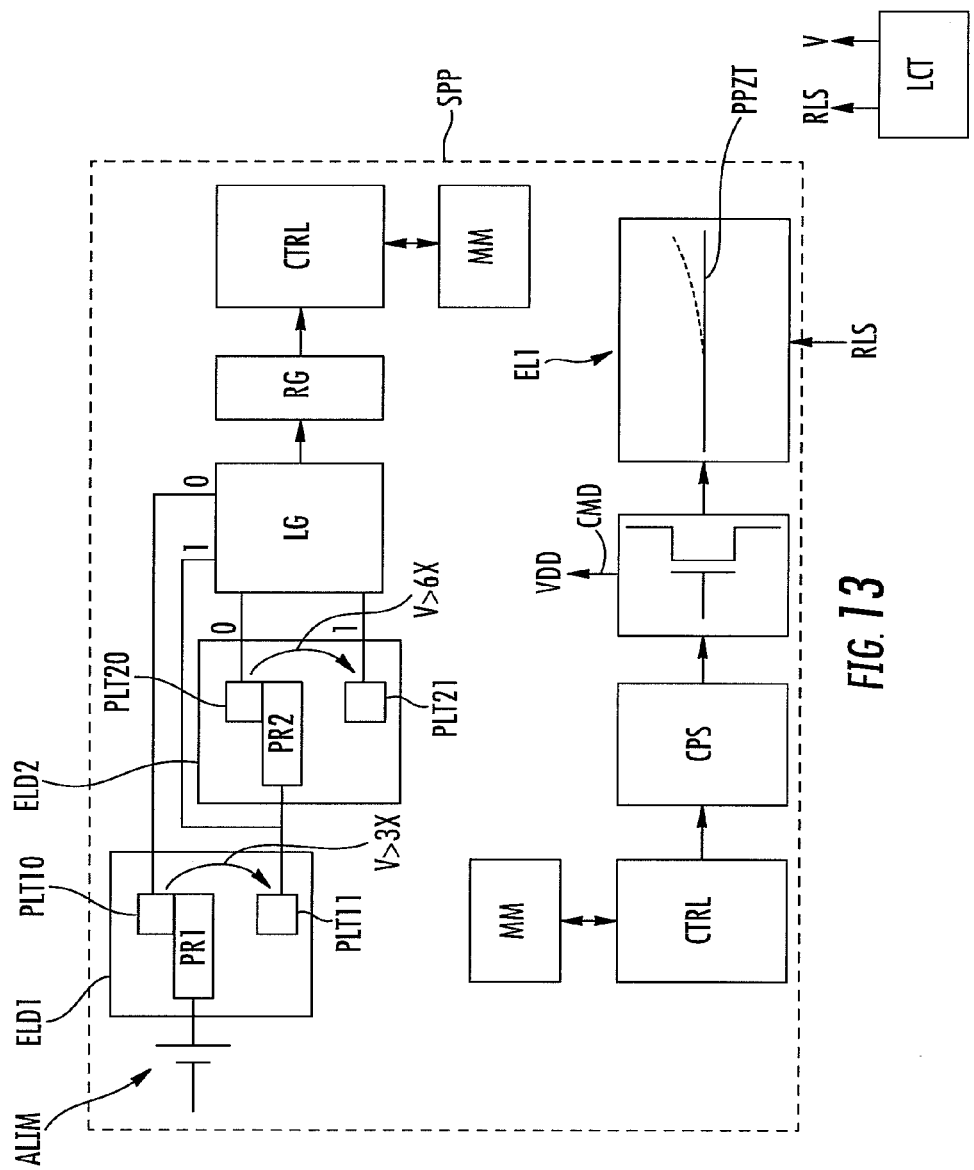
FIG. 13 is a schematic block diagram of the control device, according to the present invention.

It is equally possible, as illustrated in FIG. 13, to fit the medium STP with two additional elements ELD1 and ELD2. In the example illustrated in this FIG. 13, each element ELDi comprises a beam that can be deformed under the effect of the centrifugal force resulting from the rotation of the medium. However, the threshold of deformation is different for the two elements. Thus, for a rotation speed of less than 3×, the beam PR1 of the element ELD1 is in contact with the pad PLT10 while it comes into contact with the pad PLT11 for a rotation speed higher than 3×.

For the element ELD2, the speed threshold is fixed at 6×. Thus, for a speed of less than 6×, the beam PR2 of the element ELD2 is in contact with the pad PLT20 while for a speed higher than 6×, the beam PR2 comes into contact with the pad PLT21. The beam PR1 is also connected to the power supply source ALIM. The pad PLT11 is connected to the beam PR2. Moreover, each of the pads PLT10, PLT11, PLT20 and PLT21 is connected to an input of a control logic LG.

As an example, the beam PR1 in contact with the pad PLT10 corresponds to a logic state "0" for the element ELD1, while the beam PR1 in contact with the pad PLT11 corresponds to a logic state "1". Similarly, the beam PR2 in contact with the pad PLT20 corresponds to a logic state "0" for the element ELD2, while the beam PR2 in contact with the pad PLT21 corresponds to the logic state "1" for the element ELD2. Also, the control logic LG is configured to deliver a bit having the logic value "0" when the element ELD1 supplies successively logic values "1" and "0", and the element ELD2 supplies successively logic values "0" and "0". The logic LG delivers a bit having the logic value "1" when the element ELD1 takes successively the two logic states "1" and "1" and the element ELD2 takes successively the two logic states "0" and "1".

After a serial parallel conversion, digital words, for example bytes, containing the bits delivered by the logic LG, are stored in a register RG before being processed by processing means, for example, a microcontroller CTRL, and an associated memory MM. Such a transmission of information is asynchronous, i.e. with no common time reference between the drive and the medium SPP.

Specifically, there is no further need for a common time reference because each bit is transmitted by virtue of an identifiable event. In this instance, the transition from a rotation speed of 4× to 2× corresponds to the encoding of a logic "0" while the transition from a rotation speed of 4× to 8× corresponds to an encoding of a logic "1."

FIG. 14 illustrates an example of transmitting bits resulting from a speed-controlled rotation of the medium by the drive. In the example of FIG. 14, the rotation speed, after having reached the speed 4×, sustains controlled jumps from 4× to 2×, from 2× to 4×, from 4× to 8×, and from 8× to 4×. Thus, the transition from a speed of 4× to 2× effectively corresponds to a bit read that is equal to "0" while a transition from 4× to 8× corresponds to a bit read that is equal to "1".

If reference is made again to FIG. 13, it can be seen that the devices or means allowing the transmission of binary information from the medium SPP to the drive LCT comprise the microcontroller CTRL, parallel series conversion means or a converter CPS, and control means or a controller CMD comprising a transistor controlled on its gate by bit values delivered by the parallel series conversion means CPS.

As a function of the logic value of the bit, the power supply voltage Vdd is delivered or not delivered to the beam of the element EL1 fitted with a piezoelectric material PPZT. Therefore, depending on whether a voltage is or is not applied to the material PPZT, the beam may or may not deform. Also, since the beam facing the laser beam is fitted with a reflective portion, as explained hereinabove, this element may behave like an area of type Z1 or like an area of type Z2. The content of the data medium may therefore be modified according to the logic value of the bit delivered by the microcontroller CTRL and the drive LCT may be able to read this logic value.

The means mentioned above make it possible to transmit control instructions to the medium SPP and to read values supplied by the latter (values simply stored in the memory MM for example, or resulting from computations made by the microcontroller).

All the communications are initiated by the application software of the drive LCT. Among the available control instructions there may be: instructions designed for the authentication of the medium by the application software, instructions for reading values contained in the medium SPP, and if the medium contains a modifiable nonvolatile memory, instructions for writing in this memory.

As a non-limiting example, a possible sequence of operations is as follows: the drive LCT transmits a control instruction, optionally followed by one or more associated parameters, then reads the result just after sending the control instruction and the optional parameters, or by using a second explicit read control instruction, and finally compares the result read with an expected value, for example in the case of an interchange associated with a procedure for authenticating the medium.

That which is claimed is:

1. A copy-protected data disc comprising:
a base;
a reflective layer supported by said base and having a plurality of pitted areas and a plurality of land areas; and
at least one controller element carried by said reflective layer and configured to operate in a pitted area state at a first rotational speed of said base or a land area state at a second rotational speed of said base, the first rotational speed being different from the second rotational speed.

2. The copy-protected data disc according to claim 1 wherein said at least one controller element comprises a deformable portion configured to take at least two different positions corresponding respectively to the pitted area state and the land area state.

3. The copy-protected data disc according to claim 2 wherein said at least one controller element comprises a frame; wherein said deformable portion comprises a cantilevered beam fixed to said frame and having a reflective portion; wherein said frame is configured to place said reflective portion substantially in a same plane as a land area of the reflective layer and turned towards the base; and wherein said cantilevered beam is configured to place said reflective portion in response to the command in the at least two different positions.

4. The copy-protected data disc according to claim 1 wherein said at least one controller element comprises a casing, and a body configured to rotate relative to said casing and to have a plurality of outer surfaces; and wherein at least two portions of the plurality of outer surfaces correspond to the pitted area state and the land area state, each portion corresponding to a different angular position of said body.

5. The copy-protected data disc according to claim 1 wherein said at least one controller element is configured to selectively take one of the pitted area state and the land area state in response to application of a centrifugal force forming the command and resulting from the rotation of said base.

6. The copy-protected data disc according to claim 3 wherein said cantilevered beam extends substantially perpendicularly to a radius of said base, the at least two different positions corresponding respectively to the first rotational speed of said base and to the second rotational speed of said base.

7. The copy-protected data disc according to claim 4 wherein said body is rotatable relative to said casing about a spindle that is substantially parallel to a plane of said base and substantially perpendicularly to a radius of said base; and wherein each portion of said plurality of outer surfaces of said body corresponds to an angular position associated with a centrifugal force.

8. The copy-protected data disc according to claim 1 further comprising a controller configured to place said at least one controller element selectively in one of the pitted area state and the land area state.

9. The copy-protected data disc according to claim 8 wherein said at least one controller element is configured to be insensitive to a centrifugal force resulting from a rotation of said base.

10. The copy-protected data disc according to claim 3 wherein said cantilevered beam extends substantially parallel to a radius of said base.

11. The copy-protected data disc according to claim 8 wherein said at least one controller element comprises a piezoelectric element; and wherein said controller is configured to apply a variable electric field to said piezoelectric element.

12. The copy-protected data disc according to claim 8 further comprising at least one additional controller element having at least two different states and configured to take one of the at least two different states in response to a centrifugal force resulting from a rotation of said base, thereby allowing a transmission of content depending on the states of said at least one additional controller element.

13. The copy-protected data disc according to claim 12 wherein said at least one additional controller element is configured to define at least one switch capable of selectively taking at least two different positions depending on the rotational speed of said base; further comprising a power supply source, and a processor; wherein said at least one additional controller element is connected between said power supply source and said processor so as to transmit binary information to said processor, the values of which depend on the position of the at least one switch.

14. The copy-protected data disc according to claim 13 further comprising first and second pads; and wherein said at least one additional controller element comprises a cantilevered beam connected to said power supply source and configured to, in response to the first rotational speed of said base, come into contact with said first pad, and, in response to the second rotational speed of said base, come into contact with said second pad.

15. The copy-protected data disc according to claim 14 wherein said cantilevered beam extends substantially perpendicularly to a radius of said base.

16. A copy-protected system comprising:
a data disc comprising a base, a reflective layer supported by said base and having a plurality of pitted areas and a plurality of land areas, and at least one controller element carried by said reflective layer and configured to operate in a pitted area state at a first rotational speed of said base or a land area state at a second rotational speed of said base, the first rotational speed being different from the second rotational speed; and
a reading device configured to control a rotational speed of the data disc and to read content therefrom.

17. The copy-protected system according to claim 16 wherein said at least one controller element comprises a deformable portion configured to take a plurality of different positions corresponding respectively to the pitted area state and the land area state.

18. The copy-protected system according to claim 17 wherein said at least one controller element comprises a frame; wherein said deformable portion comprises a cantilevered beam fixed to said frame and having a reflective portion; wherein said frame is configured to place said reflective portion substantially in a same plane as a land area of the reflective layer and turned towards the base; and wherein said cantilevered beam is configured to place said reflective portion in response to the command in at least two different positions.

19. The copy-protected system according to claim 18 wherein said at least one controller element comprises a casing, and a body configured to rotate relative to said casing and to have a plurality of outer surfaces; and wherein at least two portions of the plurality of outer surfaces correspond to the pitted area state and the land area states, each portion corresponding to a different angular position of said body.

20. The copy-protected system according to claim 16 wherein said at least one controller element is configured selectively take one of the pitted area state and the land area state in response to application of a centrifugal force forming the command and resulting from rotation of the data disc.

21. The copy-protected system according to claim 20 wherein the pitted area state and the land area state related to different rotational speeds.

* * * * *

UNITED STATES PATENT AND TRADEMARK OFFICE
CERTIFICATE OF CORRECTION

| | | |
|---|---|---|
| PATENT NO. | : 8,743,670 B2 | Page 1 of 1 |
| APPLICATION NO. | : 13/267486 | |
| DATED | : June 3, 2014 | |
| INVENTOR(S) | : Orlando | |

It is certified that error appears in the above-identified patent and that said Letters Patent is hereby corrected as shown below:

In the Claims

Column 12, Line 33     Delete: "land area states"
                               Insert: --land area state--

Column 12, Line 36     Delete: "is configured"
                               Insert: --is configured to--

Column 12, Line 41     Delete: "state related"
                               Insert: --state are related--

Signed and Sealed this
Thirtieth Day of June, 2015

Michelle K. Lee
*Director of the United States Patent and Trademark Office*